(12) United States Patent
Li et al.

(10) Patent No.: US 8,910,139 B2
(45) Date of Patent: Dec. 9, 2014

(54) METHOD FOR PROCESSING FIRMWARE BASED ON FIRMWARE OVER THE AIR TECHNOLOGY, APPARATUS, AND SYSTEM

(71) Applicant: Huawei Device Co., Ltd., Guangdong (CN)

(72) Inventors: Xiangyu Li, San Diego, CA (US); Peng Lei, Beijing (CN); Ming Zhong, Beijing (CN); Zhifeng Jia, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 96 days.

(21) Appl. No.: 13/712,646

(22) Filed: Dec. 12, 2012

(65) Prior Publication Data

US 2013/0111455 A1 May 2, 2013

Related U.S. Application Data

(63) Continuation of application No. PCT/CN2011/075701, filed on Jun. 14, 2011.

(30) Foreign Application Priority Data

Aug. 27, 2010 (CN) .............................. 201010268847

(51) Int. Cl.
*G06F 9/44* (2006.01)
(Continued)

(52) U.S. Cl.
CPC ................ *G06F 8/65* (2013.01); *G06F 21/572* (2013.01); *H04L 9/00* (2013.01); *H04L 9/3239* (2013.01); *H04W 12/12* (2013.01); *H04L 1/0061* (2013.01); *H04L 9/3247* (2013.01); *H04L 2209/80* (2013.01); *H04W 12/02* (2013.01)
USPC ............................ 717/168; 717/172; 717/177

(58) Field of Classification Search
None
See application file for complete search history.

(56) References Cited

U.S. PATENT DOCUMENTS

| 7,426,633 B2 * | 9/2008 | Thompson et al. ............ 717/172 |
| 7,480,907 B1 * | 1/2009 | Marolia et al. ................. 717/172 |

(Continued)

FOREIGN PATENT DOCUMENTS

| CN | 1968477 A | 5/2007 |
| CN | 101106773 A | 1/2008 |

(Continued)

OTHER PUBLICATIONS

David Abrahamsson, "Security Enhanced Firmware Update Procedures in Embedded Systems", Jun. 10, 2008, Linköping University, Sweden, pp. 1-72; <www.diva-portal.org/smash/get/diva2:174606/FULLTEXT01.pdf>.*

(Continued)

*Primary Examiner* — Thuy Dao
*Assistant Examiner* — Ben C Wang
(74) *Attorney, Agent, or Firm* — Leydig, Voit & Mayer, Ltd.

(57) ABSTRACT

Embodiments of the present invention provide a method for processing firmware based on a firmware over the air technology, an apparatus, and a system. The method includes: performing check processing on at least one firmware upgrade file to form first check data; performing encryption processing on the first check data to form first encryption data; and combining the first encryption data, the first check data, and the firmware upgrade file to a firmware upgrade package, and sending the firmware upgrade package through an air interface to a mobile terminal. The apparatus includes: a checking module, an encrypting module, and a processing module. The system includes: a server and a mobile terminal. The embodiments of the present invention, by performing check, encryption, and combination processing on the firmware upgrade file, quickly implements upgrade of multiple pieces of firmware, and improves security of the mobile terminal.

10 Claims, 7 Drawing Sheets

(51) Int. Cl.
  *G06F 9/445* (2006.01)
  *G06F 21/57* (2013.01)
  *H04L 9/00* (2006.01)
  *H04L 9/32* (2006.01)
  *H04W 12/12* (2009.01)
  *H04L 1/00* (2006.01)
  *H04W 12/02* (2009.01)

(56) References Cited

U.S. PATENT DOCUMENTS

| | | | |
|---|---|---|---|
| 7,549,042 B2 * | 6/2009 | Glaum et al. | 713/100 |
| 7,640,367 B2 * | 12/2009 | Takamoto et al. | 717/177 |
| 7,689,981 B1 * | 3/2010 | Gustafson | 717/168 |
| 7,694,293 B2 * | 4/2010 | Rao | 717/172 |
| 7,725,889 B2 * | 5/2010 | Gustafson et al. | 717/168 |
| 7,752,616 B2 * | 7/2010 | Marolia et al. | 717/177 |
| 7,950,006 B2 * | 5/2011 | Yang | 717/172 |
| 8,032,881 B2 * | 10/2011 | Holmberg et al. | 717/177 |
| 8,726,259 B2 * | 5/2014 | Juneja | 717/168 |
| 2004/0040020 A1 * | 2/2004 | Yang | 717/168 |
| 2004/0123282 A1 * | 6/2004 | Rao | 717/168 |
| 2004/0243991 A1 * | 12/2004 | Gustafson et al. | 717/168 |
| 2005/0114852 A1 * | 5/2005 | Chen et al. | 717/168 |
| 2005/0268296 A1 * | 12/2005 | Marolia et al. | 717/168 |
| 2006/0107260 A1 | 5/2006 | Motta | |
| 2007/0143530 A1 * | 6/2007 | Rudelic et al. | 711/103 |
| 2007/0169073 A1 * | 7/2007 | O'Neill et al. | 717/168 |
| 2007/0288914 A1 * | 12/2007 | Brannock et al. | 717/169 |
| 2009/0279699 A1 | 11/2009 | Noda | |
| 2009/0320012 A1 | 12/2009 | Lee et al. | |
| 2012/0011219 A1 | 1/2012 | Zhang et al. | |

FOREIGN PATENT DOCUMENTS

| | | |
|---|---|---|
| CN | 101247416 A | 8/2008 |
| CN | 101251883 A | 8/2008 |
| CN | 101924607 A | 12/2010 |
| EP | 2271045 A1 | 1/2011 |
| JP | 2003304235 A | 10/2003 |
| JP | 2004514214 A | 5/2004 |
| JP | 2009038603 A | 2/2009 |
| JP | 2009188930 A | 8/2009 |
| WO | WO 2009117896 A1 | 10/2009 |

OTHER PUBLICATIONS

Mitchell et al., "Systematic Audit of Third-Party Android Phones", 2014 ACM, CODASPY'04, Mar. 2014, San Antonio, Texas, USA, pp. 175-186; <http://dl.acm.org/results.cfm?h=1&source_query=&&cfid=417717926&cftoken=68174932>.*

Wee et al., "A New Code Compression Method for FOTA", Dec. 30, 2011, IEEE, pp. 2350-2354; <http://ieeexplore.ieee.org/stamp/stamp.jsp?tp=&arnumber=5681111>.*

Extended European Search Report in corresponding European Patent Application No. 11819338.2 (Aug. 20, 2013).

Written Opinion of the International Searching Authority in corresponding PCT Patent Application No. PCT/CN2011/075701 (Sep. 22, 2011).

"RSA Encryption with Private Key and Decryption with a Public Key," 2013, Stack Exchange, Inc., New York, New York.

International Search Report in corresponding PCT Patent Application No. PCT/CN2011/075701 (Sep. 22, 2011).

1$^{st}$ Office Action in corresponding Chinese Patent Application No. 201010268847.X (May 8, 2012).

2$^{nd}$ Office Action in corresponding Chinese Patent Application No. 201010268847.X (Oct. 18, 2012).

Chinese Search Report in corresponding Chinese Patent Application No. 201010268847.X (Apr. 21, 2012).

* cited by examiner

METHOD FOR PROCESSING FIRMWARE BASED ON FIRMWARE OVER THE AIR TECHNOLOGY, APPARATUS, AND SYSTEM

CROSS-REFERENCE TO RELATED APPLICATIONS

This application is a continuation of International Patent Application No. PCT/CN2011/075701, filed on Jun. 14, 2011, which claims priority to Chinese Patent Application No. 201010268847.X, filed on Aug. 27, 2010, both of which are hereby incorporated by reference in their entireties.

FIELD OF THE INVENTION

The present invention relates to the field of wireless communications technologies, and in particular to a method for processing firmware based on a firmware over the air (Firmware Over The Air, FOTA) technology, an apparatus, and a system.

BACKGROUND OF THE INVENTION

With the development of technologies, functions of a mobile terminal such as a mobile phone are increasingly powerful. Software (also known as firmware) in the mobile terminal also grows in size. Once a mobile terminal is launched to the market and its firmware needs to be upgraded, because users are widely distributed, a traditional upgrade method, such as a recall of mobile terminals by a manufacturer for upgrade or an upgrade through the Internet, is hardly feasible.

Therefore, a technology of upgrading the firmware of a mobile terminal by using a FOTA technology is applied. FOTA sends an upgrade packet to the mobile terminal through an air interface of the mobile terminal for the mobile terminal to upgrade the firmware, such as a code and file system, on its own. Because the operation is simple and may be completed by a user itself, a FOTA upgrade method is more and more preferred by a carrier.

A common existing FOTA upgrade method is to, by using a certain algorithm, calculate an upgrade packet for two versions of a certain firmware before and after an upgrade, download the upgrade packet through the air interface of the mobile terminal to the mobile terminal of a user, start a FOTA upgrade process in the mobile terminal and complete the upgrade of the firmware, and restart the mobile terminal to start the firmware after the upgrade.

During implementation of the present invention, the inventor finds that the prior art at least has the following problem: The upgrade packet for firmware upgrade is directly transmitted to the mobile terminal through the air interface, bringing the mobile terminal under a threat of intrusion by illegal codes.

SUMMARY OF THE INVENTION

Embodiments of the present invention provide a method for processing firmware based on a firmware over the air technology, an apparatus, and a system, which are used to solve a defect in the prior art that a mobile terminal is vulnerable to intrusion of illegal codes, quickly implement upgrade of multiple pieces of firmware, and improve security of the mobile terminal.

An embodiment of the present invention provides a method for processing firmware based on a firmware over the air technology, including:

performing check processing on at least one firmware upgrade file to form first check data;

performing encryption processing on the first check data to form first encryption data; and combining the first encryption data, the first check data, and the firmware upgrade file to a firmware upgrade package, and sending the firmware upgrade package through an air interface to a mobile terminal.

An embodiment of the present invention further provides a method for upgrading firmware based on a firmware over the air technology, including:

receiving, through an air interface, a firmware upgrade package sent by a server and storing the firmware upgrade package in a cache partition;

reading the firmware upgrade package stored in the cache partition, where the firmware upgrade package includes: first encryption data, first check data, and a firmware upgrade file;

decrypting the first encryption data in the firmware upgrade package to form second check data; and when the second check data is consistent with the first check data, performing an upgrade operation for corresponding firmware according to the firmware upgrade file in the firmware upgrade package.

The present invention provides a server, including:

a checking module, configured to perform check processing on at least one firmware upgrade file to form first check data;

an encrypting module, configured to perform encryption processing on the first check data formed by the checking module to form first encryption data; and a processing module, configured to combine the first encryption data, the first check data, and the firmware upgrade file to a firmware upgrade package, and send the firmware upgrade package through an air interface to a mobile terminal.

The present invention further provides a mobile terminal, including:

a receiving module, configured to receive, through an air interface, a firmware upgrade package sent by a server, and store the firmware upgrade package in a cache partition;

a reading module, configured to read the firmware upgrade package stored in the cache partition, where the firmware upgrade package includes: first encryption data, first check data, and a firmware upgrade file;

a decrypting module, configured to decrypt the first encryption data in the firmware upgrade package read by the reading module to form second check data; and an upgrading module, configured to perform an upgrade operation on corresponding firmware according to the firmware upgrade file in the firmware upgrade package when the second check data is consistent with the first check data.

An embodiment of the present invention further provides a system for upgrading firmware based on a firmware over the air technology, including: the foregoing server and mobile terminal.

By performing check, encryption, and combination processing on the firmware upgrade file, the method for processing firmware based on the firmware over the air technology, apparatus, and system in the embodiments of the present invention solve the defect in the prior art that the mobile terminal is vulnerable to the intrusion of illegal codes, quickly implement the upgrade of multiple pieces of firmware, and improve the security of the mobile terminal.

BRIEF DESCRIPTION OF THE DRAWINGS

To illustrate the technical solutions in the present invention or in the prior art more clearly, accompanying drawings that need to be used in the description of the embodiments or the prior art are briefly presented in the following. Obviously, the accompanying drawings in the following description are merely some embodiments of the present invention. Persons of ordinary skill in the art may obtain other drawings based on these accompanying drawings without making creative efforts.

DETAILED DESCRIPTION OF THE EMBODIMENTS

To better clarify the purposes, technical solutions, and advantages of the embodiments of the present invention, the embodiments of the present invention are clearly and completely described with reference to the accompanying drawings in the following. Evidently, the embodiments described are part of rather than all of the embodiments of the present invention. All other embodiments obtained by persons of ordinary skill in the art based on the embodiments of the present invention without making creative efforts shall fall within the protection scope of the present invention.

Figure 1:
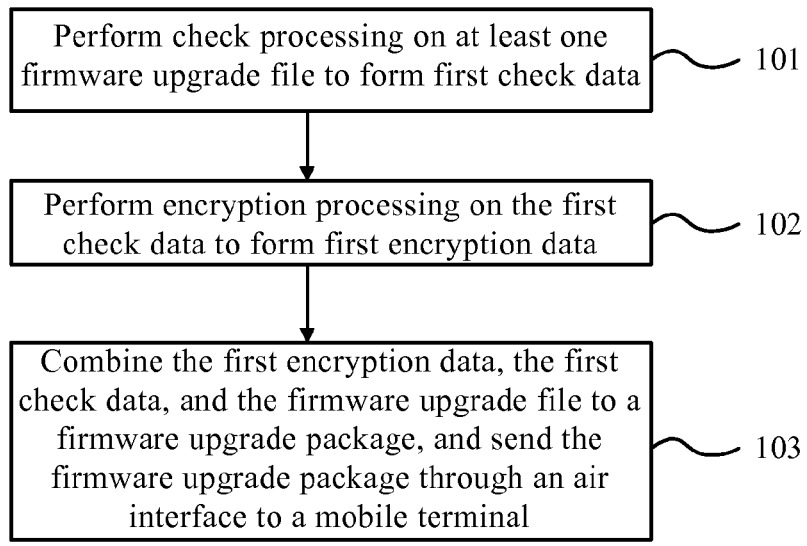
FIG. 1 is a flowchart of a method for processing firmware based on a firmware over the air technology according to an embodiment of the present invention.

FIG. 1 is a flowchart of a method for processing firmware based on a firmware over the air technology according to an embodiment of the present invention. As shown in FIG. 1, this embodiment of the present invention provides a method for processing firmware based on the firmware over the air technology, including:

Step 101: Perform check processing on at least one firmware upgrade file to form first check data.

Step 102: Perform encryption processing on the first check data to form first encryption data.

Step 103: Combine the first encryption data, the first check data, and the firmware upgrade file to a firmware upgrade package, and send the firmware upgrade package through an air interface to a mobile terminal.

In this embodiment, the foregoing steps may be executed by a server. The mobile terminal may include multiple pieces of firmware to be upgraded, such as a binary file, a file system, an upgrade execution script, and so on. On a server side, perform the check processing on the firmware upgrade file of the at least one firmware to be upgraded to form the first check data; then, perform the encryption processing on the first check data to form the first encryption data; finally, combine the first encryption data, the first check data, and the firmware upgrade file to one firmware upgrade package, and send the firmware upgrade package through the air interface to the mobile terminal, so that the mobile terminal perform firmware upgrade according to the received firmware upgrade package.

The method for processing firmware based on the firmware over the air technology in this embodiment of the present invention, by performing the check, encryption, and combination processing on the firmware upgrade file to form the firmware upgrade package, and performing the firmware upgrade in the mobile terminal according to the firmware upgrade package, solves a defect in the prior art that the mobile terminal is vulnerable to intrusion of illegal codes, quickly implements upgrade of multiple pieces of firmware, and improves security of the mobile terminal.

On the basis of the foregoing method embodiment, step 101 may include:

a1: Perform cyclic redundancy check (Cyclic Redundancy Check, CRC) processing on the at least one firmware upgrade file to form CRC data as the first check data; or a2: Perform message-digest algorithm 5 (Message-Digest Algorithm 5, hereinafter referred to as MD5) processing on the at least one firmware upgrade file to form MD5 information check data as the first check data.

When performing the check processing on the firmware upgrade file, the server may adopt a CRC method, and may also use an MD5 method. Length of check data formed by using the CRC method increases proportionally with length of the firmware upgrade file, whereas length of check data formed by using the MD5 method is fixed. In a subsequent encryption procedure, the less the encrypted data is, the higher the efficiency is. Therefore, performing the check processing by using the MD5 method is an exemplary solution.

On the basis of the foregoing technical solution, step 102 may include:

b1: Perform private key encryption on the first check data and use encrypted data as the first encryption data.

The server may perform the encryption processing on the first encryption data by using an internally stored private key. The private key matches a public key internally set in the mobile terminal on factory delivery.

Further, when the first check data is CRC data, that is, when the firmware upgrade file is processed by using the CRC method, step 102 may include:

b2: Perform the private key encryption on the CRC data and the firmware upgrade file to form encrypted data, where the encrypted data includes encrypted CRC data and an encrypted firmware upgrade file, where the encrypted CRC data is the first encryption data, and at this time, the firmware upgrade file included in the firmware upgrade package is the encrypted firmware upgrade file; or b3: Perform MD5 processing on the CRC data to form MD5 information corresponding to the CRC data, and perform the private key encryption on the corresponding MD5 information to form the first encryption data.

Meanwhile, when the first check data is MD5 information check data, that is, the firmware upgrade file is processed by using the MD5 method, CRC processing may first be performed on the MD5 information check data to form the CRC data, and then private key encryption is performed on the CRC data to form the first encryption data.

That is to say, in a phase of performing the check and encryption processing on the firmware upgrade file, before the step of performing the private key encryption, the CRC processing or MD5 processing or a combination of the two may be performed on the firmware upgrade file, and a sequence of the two is not limited.

In addition, before the foregoing step 101, the method for processing firmware based on the firmware over the air technology provided in this embodiment may further include:

c1: Obtain multiple firmware upgrade files, and at this time, the firmware upgrade package includes the obtained multiple firmware upgrade files.

The server may form the firmware upgrade package according to the sequence in Table 1.

TABLE 1

| Name | Description |
|---|---|
| First encryption data | 128 byte data derived from the CRC data via MD5 processing and then encryption by a downloaded code private key (KEY_A) |
| CRC data | A CRC value list of each firmware upgrade file. According to a sequence in the firmware upgrade package, each firmware upgrade file is segmented in sequence according to CRC_LENGTH (32K Bytes), and CRC16 processing is performed. A CRC value (2 byte) of each segment is arranged in sequence to form the CRC data. If length of the last segment of each firmware upgrade file for the CRC processing is less than CRC_LENGTH, the CRC processing is performed according to an actual length. |
| MOD1 | Content of a firmware upgrade file 1 |
| MOD2 | Content of a firmware upgrade file 2 |
| ... | ... |

Figure 2:
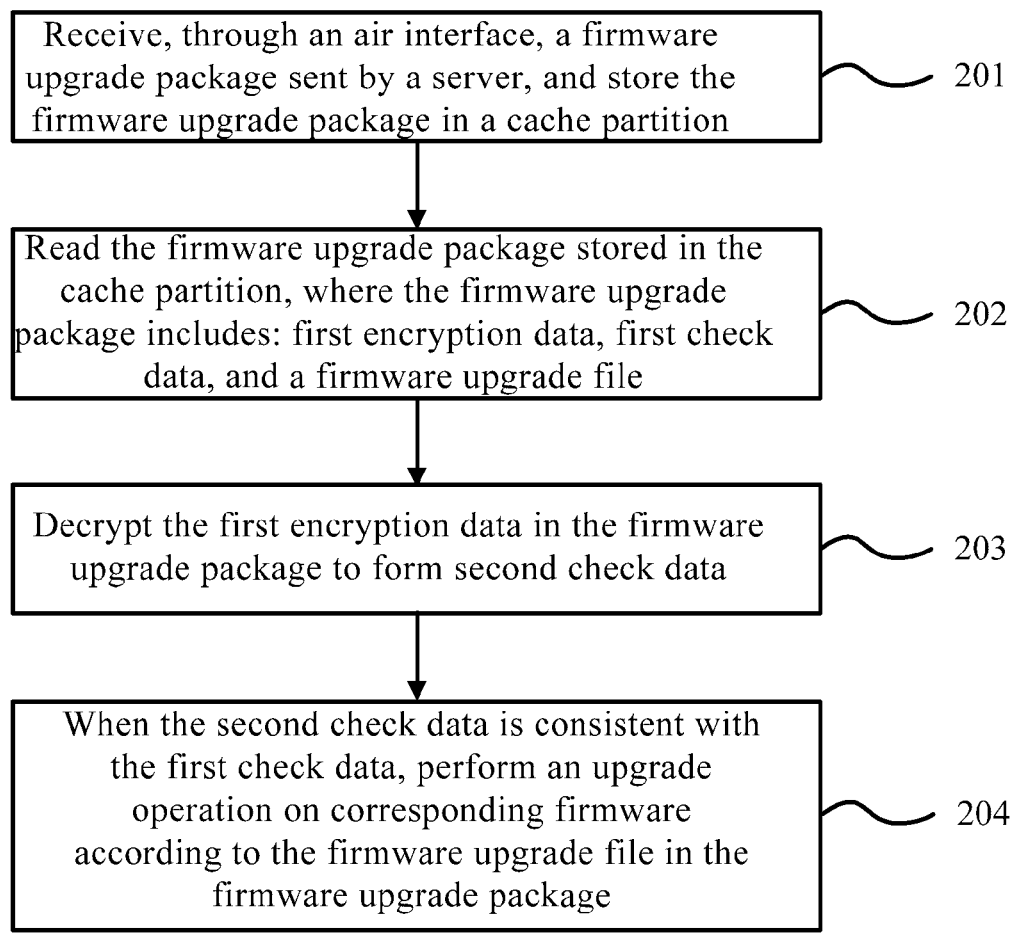
FIG. 2 is a flowchart of a method for upgrading firmware based on a firmware over the air technology according to an embodiment of the present invention.

FIG. 2 is a flowchart of a method for processing firmware based on a firmware over the air technology according to an embodiment of the present invention. As shown in FIG. 2, this embodiment of the present invention provides a method for processing firmware based on the firmware over the air technology, including:

Step 201: Receive, through an air interface, a firmware upgrade package sent by a server, and store the firmware upgrade package to in a cache partition.

Step 202: Read the firmware upgrade package stored in the cache partition, where the firmware upgrade package includes: first encryption data, first check data, and a firmware upgrade file.

Step 203: Decrypt the first encryption data in the firmware upgrade package to form second check data.

Step 204: When the second check data is consistent with the first check data, perform an upgrade operation on corresponding firmware according to the firmware upgrade file in the firmware upgrade package.

In this embodiment, the foregoing steps may be executed by a mobile terminal. The mobile terminal may include multiple pieces of firmware to be upgraded, such as a binary file, a file system, an upgrade execution script, and so on. After a server side performs an operation on a firmware upgrade file of at least one firmware to be upgraded and sends a formed firmware upgrade package through the air interface to the mobile terminal whose firmware is to be upgraded, the mobile terminal stores the received firmware upgrade package in the cache (CACHE) partition. The mobile terminal reads the firmware upgrade package in the cache partition, where the firmware upgrade package includes the first encryption data, the first check data, and the firmware upgrade file, decrypts the first encryption data in the firmware upgrade package to form the second check data, and when the second check data is consistent with the first check data, performs the upgrade operation on the corresponding firmware according to the firmware upgrade file in the firmware upgrade package.

In the method for upgrading firmware based on a firmware over the air technology in this embodiment, after receiving the firmware upgrade package formed by the server by performing check, encryption, and combination processing on the firmware upgrade file, the mobile terminal performs a corresponding decryption operation on the firmware upgrade package to perform a firmware upgrade, which solves a defect in the prior art that the mobile terminal is vulnerable to intrusion of illegal codes, quickly implements upgrade of multiple pieces of firmware, and improves security of the mobile terminal.

Figure 3A:
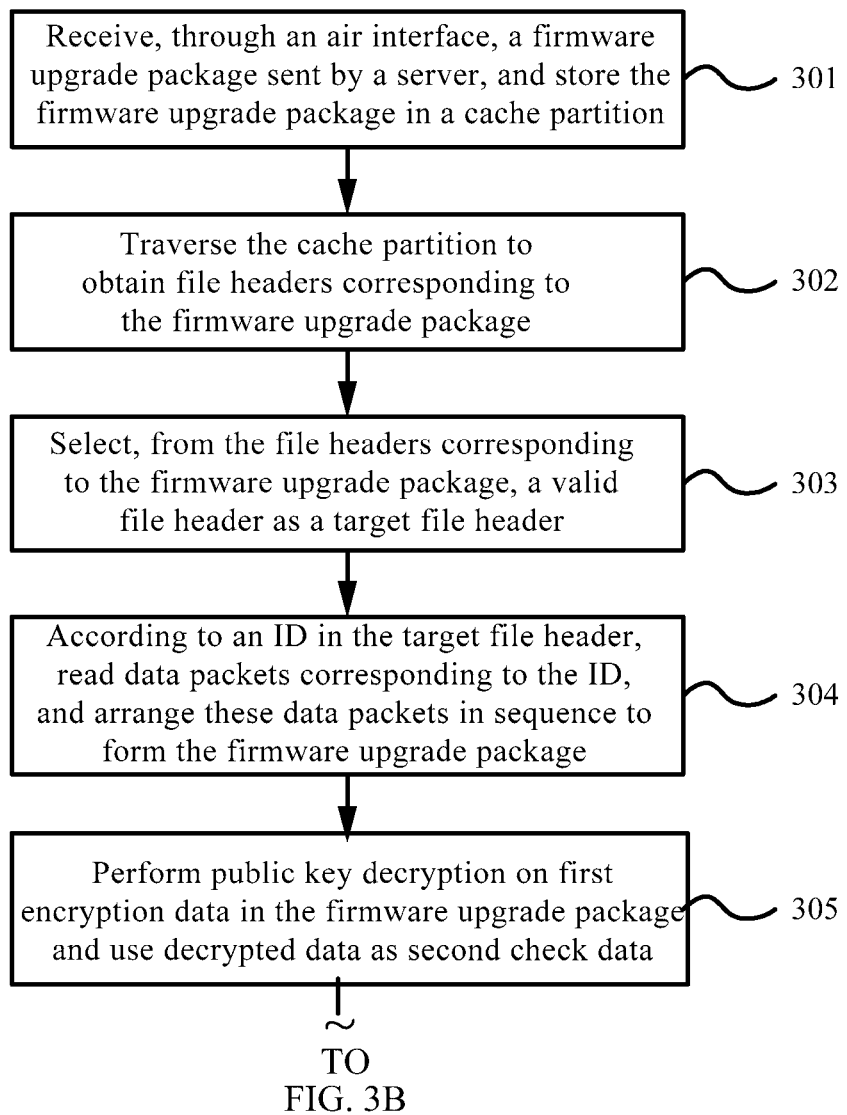
FIGS. 3a and 3b is a flowchart of a method for upgrading firmware based on a firmware over the air technology according to another embodiment of the present invention.
Figure 3B:
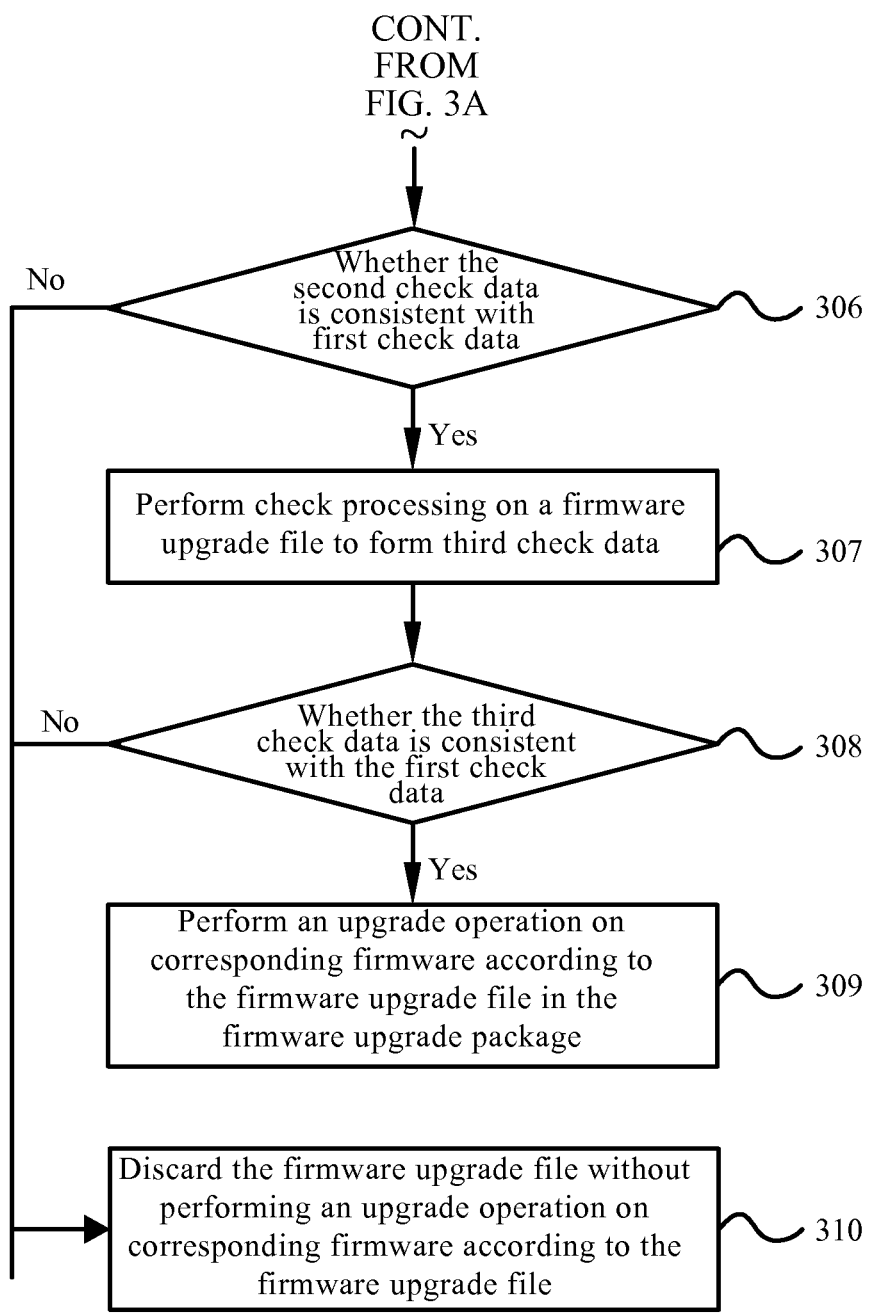

FIG. 3 is a flowchart of a method for upgrading firmware based on a firmware over the air technology according to another embodiment of the present invention. As shown in FIG. 3, on the basis of the foregoing embodiment shown in FIG. 2, the present invention further puts forward a method for upgrading firmware based on a firmware over the air technology, including:

Step 301: Receive, through an air interface, a firmware upgrade package sent by a server, and store the firmware upgrade package in a cache partition.

Step 302: Traverse the cache partition to obtain file headers corresponding to the firmware upgrade package.

Step 303: Select, from the file headers corresponding to the firmware upgrade package, a valid file header as a target file header.

In the CACHE partition, if a certain file is stored, assume that its identity (ID) is ID_a, a file header including ID_a needs to be written into the CACHE partition; when updating the file, set its corresponding file header to invalid (that is, write a file header whose file name is "unlinked" and whose ID is ID_a into the CACHE partition), and then re-write a new file header (assume that an ID of an updated file is ID_b; then write a file header including ID_b into the CACHE partition). Therefore, among all the file headers corresponding to the firmware upgrade package, delete a file header whose ID is the same as the ID of the file header whose file name is "unlinked". Then, all the remaining file headers are valid file headers. Select one from the valid file headers as the target file header.

Step 304: According to an ID in the target file header, read data packets corresponding to the ID, and arrange these data packets in sequence to form the firmware upgrade package.

Step 305: Perform public key decryption on first encryption data in the firmware upgrade package and use decrypted data as second check data.

Step 306: Determine whether the second check data is consistent with first check data. If consistent, execute step 307; otherwise, execute step 310.

Step 307: Perform check processing on a firmware upgrade file to form third check data.

In this embodiment, if the firmware upgrade file in the firmware upgrade package is a firmware upgrade file that has undergone private key encryption, public key decryption needs to be performed on it before the check processing is performed.

Step 308: Verify whether the third check data is consistent with the first check data in the firmware upgrade package. If consistent, execute step 309; otherwise, execute step 310.

Step 309: Perform an upgrade operation on corresponding firmware according to the firmware upgrade file in the firmware upgrade package.

Step 310: Discard the firmware upgrade file without performing an upgrade operation on corresponding firmware according to the firmware upgrade file.

In this embodiment, the foregoing steps may be executed by a mobile terminal. On the basis of the foregoing method embodiment shown in FIG. 2, the firmware upgrade package received by the mobile terminal is stored in the CACHE partition. A yaffs2 file system may be used. However, a module OEMSBL in the mobile terminal, where the module is used for reading the firmware upgrade package, does not support the yaffs2 file system. Therefore, an operation of reading the firmware upgrade package in the cache partition by the OEMSBL may include: first, traversing the cache partition to obtain all file headers corresponding to the firmware upgrade package, for example, obtaining all file headers that meet a requirement of an upgrade packet file name; then, among these file headers, deleting a file header as long as its ID is the same as the ID of the file header whose file name is "unlinked"; then, selecting the target file header from the remaining file headers according to a certain rule, for example, selecting, from them, a file header with a maximum block number (blocknum) as the target file header, and when multiple file headers whose block numbers are the same exist, selecting, from the multiple file headers whose block numbers are the same, a file header with a maximum flash (Flash) address as the target file header; after selecting the target file header, reading the data packets corresponding to the ID of the target file header, and arranging these data packets in sequence to form a complete firmware upgrade package.

Further, the foregoing step 306 may specifically include:

d1: When the first check data is CRC data, and the first encryption data is data obtained after the private key encryption is performed on the CRC data, directly compare the second check data and the first check data to determine whether they are the same; or d2: When the first check data is MD5 information check data, and the first encryption data is data obtained after the private key encryption is performed on the MD5 information check data, directly compare the second check data and the first check data to determine whether they are the same; or d3: When the first check data is CRC data, and the first encryption data is data obtained after the private key encryption is performed on MD5 information corresponding to the CRC data, perform MD5 processing on the CRC data in the firmware upgrade package to form second MD5 information, and verify whether the second check data is consistent with the second MD5 information, where the second check data is MD5 information formed after decryption of the first encryption data in the firmware upgrade package.

The operation of performing upgrade on the corresponding firmware by the mobile terminal may include: upgrading, by the OEMSBL, a binary file, and setting a relevant flag; and performing, by another module (RECOVERY) in the mobile terminal, upgrade on a file system and processing on an upgrade execution script. After all firmware are upgraded, restart the mobile terminal and then each firmware after upgrade may be used.

In the method for upgrading firmware based on a firmware over the air technology in this embodiment, after receiving the firmware upgrade package formed by the server by performing check, encryption, and combination processing on the firmware upgrade file, the mobile terminal performs a corresponding decryption operation on the firmware upgrade package to perform a firmware upgrade, which solves a defect in the prior art that an operation is complicated and the mobile terminal is vulnerable to intrusion of illegal codes, quickly implements upgrade of multiple pieces of firmware, and improves security of the mobile terminal.

The technical solution described in the foregoing embodiment may be implemented in a smart phone. Assume that the smart phone includes two CPUs: ARM9 and ARM11, and mainly includes the following modules and file systems: OEMSBL, AMSS, EFS, BOOT, and SYSTEM. By using the technical solution in this embodiment of the present invention, all the firmware may be upgraded at one time. Table 2 shows a typical firmware upgrade package.

TABLE 2

| Name | Description |
| --- | --- |
| First encryption data | 128 byte data derived from the CRC data via MD5 processing and then encryption by a downloaded code private key (KEY_A) |
| CRC data | A CRC value list of each firmware upgrade file. According to a sequence in the firmware upgrade package, each firmware upgrade file is segmented in sequence according to CRC_LENGTH (32K Bytes), and CRC16 processing is performed. A CRC value (2 byte) of each segment is arranged in sequence to form the CRC data. If length of the last segment of each firmware upgrade file for CRC processing is less than CRC_LENGTH, the CRC processing is performed according to an actual length. |
| SW_VER_LIST | List of SW version numbers allowed to be upgraded |
| AMSS_HEAD | Header file of the AMSS |
| FW_DIFF | Differential package of all software programs to be upgraded |
| AMSS_ECC | ECC data of the AMSS |
| OEMSBL_HEADER | OEMSBL header file |
| OEMSBL | OEMSBL content |
| EFS | EFS file system |
| SOFTWARE_VER | Version number of currently upgraded SW |
| FS_DIFF | Differential package for upgrade of an ANDROID SYSTEM |
| SCRIPT.ZIP | Upgrade script executed in ANDRIOD RECOVERY |

Upgrade of the OEMSBL, AMSS, BOOT, and EFS are completed in the OEMSBL. Upgrade processing on the SYSTEM and SCRIPT.ZIP are completed in the RECOVERY. In an entire upgrade procedure, the mobile phone needs to be restarted only once.

This FOTA upgrade solution supports resumable download during a download procedure of the firmware upgrade package. After FOTA upgrade is started, the mobile terminal (for example, a mobile phone) is restarted once to complete upgrade of all firmware to be upgraded of the mobile phone. During the upgrade procedure, the FOTA upgrade solution supports power-off protection, and is compatible with processing of a SCRIPT.ZIP upgrade execution script, which provides good user experience.

Figure 4:
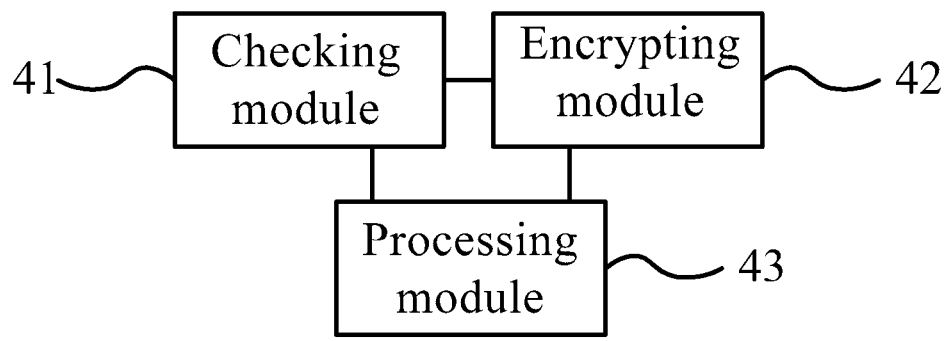
FIG. 4 is a schematic structural diagram of a server according to an embodiment of the present invention.

FIG. 4 is a schematic structural diagram of a server according to an embodiment of the present invention. As shown in FIG. 4, the embodiment of the present invention provides a server, configured to provide a firmware upgrade package to a mobile terminal. The server includes: a checking module 41, an encrypting module 42, and a processing module 43, where the checking module 41 is configured to perform check processing on at least one firmware upgrade file to form first check data; the encrypting module 42 is configured to perform encryption processing on the first check data formed by the checking module 41 to form first encryption data; and the processing module 43 is configured to combine the first encryption data, the first check data, and the firmware upgrade file to a firmware upgrade package, and send the firmware upgrade package through an air interface to the mobile terminal.

In this embodiment, the mobile terminal may include multiple pieces of firmware to be upgraded, such as a binary file, a file system, and an upgrade execution script. The server provided in this embodiment first performs the check processing on the firmware upgrade file of at least one firmware to be upgraded to form the first check data; then, performs the encryption processing on the first check data to form the first encryption data; finally, combines the first encryption data, the first check data, and the firmware upgrade file to the firmware upgrade package, and sends the firmware upgrade package through the air interface to the mobile terminal for the mobile terminal to upgrade firmware according to the received firmware upgrade package.

The server in this embodiment of the present invention, by performing check, encryption, and combination processing on the firmware upgrade file to form the firmware upgrade package, and performing a firmware upgrade in the mobile terminal according to the firmware upgrade package, solves a defect in the prior art that the mobile terminal is vulnerable to intrusion of illegal codes, quickly implements upgrade of multiple pieces of firmware, and improves security of the mobile terminal.

Figure 5:
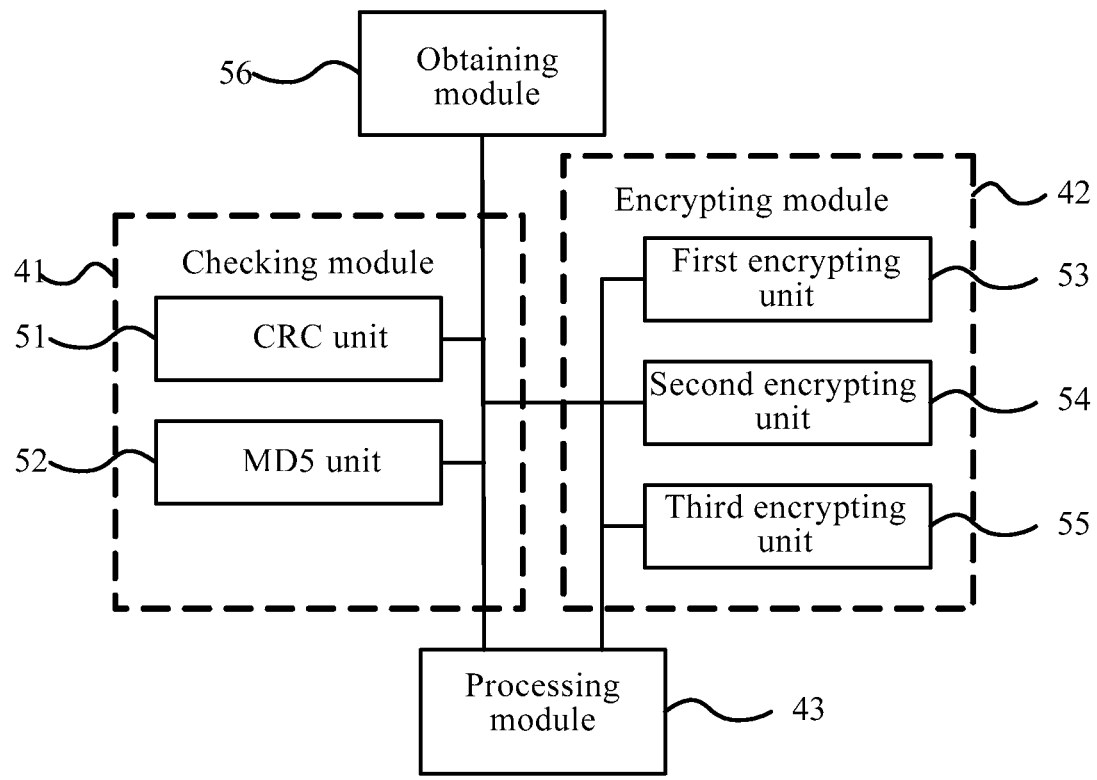
FIG. 5 is a schematic structural diagram of the server according to another embodiment of the present invention.

FIG. 5 is a schematic structural diagram of a server according to another embodiment of the present invention. As shown in FIG. 5, on the basis of the foregoing server embodiment, the checking module 41 may include: a CRC unit 51 and/or an MD5 unit 52, where the CRC unit 51 is configured to perform CRC processing on at least one firmware upgrade file to form CRC data as first check data; and the MD5 unit 52 is configured to perform MD5 processing on the at least one firmware upgrade file to form MD5 information check data as the first check data.

When performing check processing on the firmware upgrade file, the checking module 41 may adopt a CRC method, or may use a MD5 method. Length of check data formed by using the CRC method increases proportionally with length of the firmware upgrade file, whereas the length of the check data formed by using the MD5 method is fixed. In a subsequent encryption procedure, the less the encrypted data is, the higher the efficiency is. Therefore, performing the check processing by using the MD5 method is an exemplary solution.

On the basis of the foregoing technical solution, the encrypting module 42 may include: a first encrypting unit 53. The first encrypting unit 53 may be configured to perform private key encryption on the first check data and use encrypted data as first encryption data.

The first encrypting unit 53 may perform encryption processing on the first encryption data by using an internally stored private key. The private key matches a public key internally set in a mobile terminal on factory delivery.

Further, the encrypting module 42 may include: a second encrypting unit 54 and/or a third encrypting unit 55, where the second encrypting unit 54 is configured to, when the first check data is the CRC data, perform the private key encryption on the CRC data and the firmware upgrade file to form encrypted data, where the encrypted data includes encrypted CRC data and an encrypted firmware upgrade file, the encrypted CRC data is the first encryption data, and the firmware upgrade file included in a firmware upgrade package is the encrypted firmware upgrade file; and the third encrypting unit 55 is configured to, when the first check data is the CRC data, perform the MD5 processing on the CRC data to form the MD5 information corresponding to the CRC data, and perform the private key encryption on the corresponding MD5 information to form the first encryption data.

In addition, the mobile terminal provided in this embodiment may further include: an obtaining module 56, where the obtaining module 56 obtains multiple firmware upgrade files before the checking module 41 performs the check processing on the at least one firmware upgrade file, where the firmware upgrade package includes the foregoing multiple firmware upgrade files.

The server in this embodiment of the present invention, by performing check, encryption, and combination processing on the firmware upgrade file to form the firmware upgrade package, and performing a firmware upgrade in the mobile terminal according to the firmware upgrade package, solves a defect in the prior art that an operation is complicated and the mobile terminal is vulnerable to intrusion of illegal codes, quickly implements upgrade of multiple pieces of firmware, and improves security of the mobile terminal.

Figure 6:
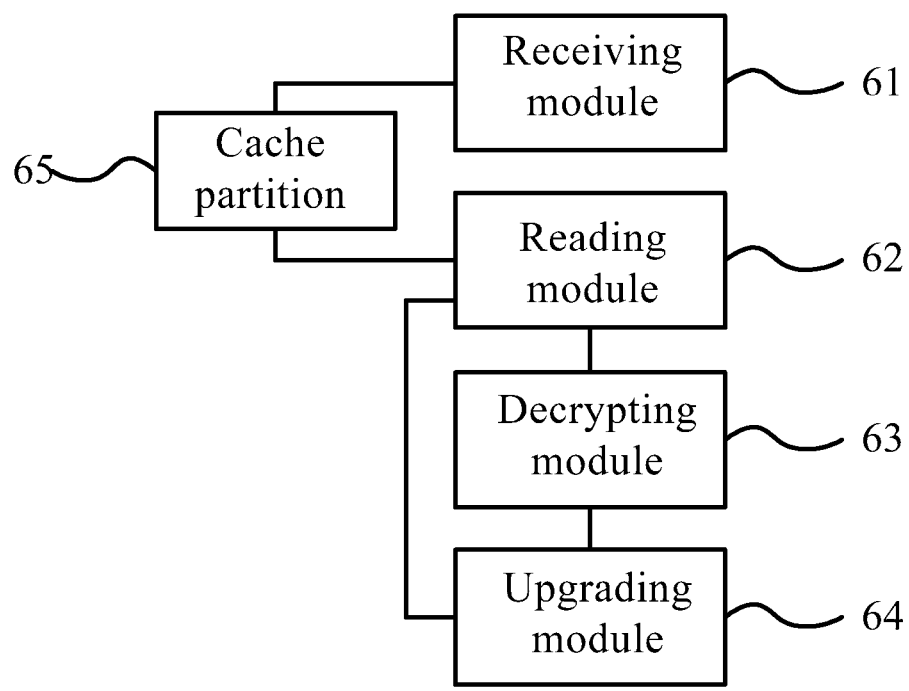
FIG. 6 is a schematic structural diagram of a mobile terminal according to an embodiment of the present invention.

FIG. 6 is a schematic structural diagram of a mobile terminal according to an embodiment of the present invention. As shown in FIG. 6, this embodiment of the present invention provides a mobile terminal that has a function of upgrading firmware. The mobile terminal includes: a receiving module 61, a reading module 62, a decrypting module 63, and an upgrading module 64, where the receiving module 61 is configured to receive, through an air interface, a firmware upgrade package sent by a server, and store the firmware upgrade package in a cache partition 65; the reading module 62 is configured to read the firmware upgrade package stored in the cache partition 65, where the firmware upgrade package includes: first encryption data, first check data, and a firmware upgrade file; the decrypting module 63 is configured to perform decryption on the first encryption data in the firmware upgrade package read by the reading module 62, to form second check data; and the upgrading module 64 is configured to perform, when the second check data is consistent with the first check data, an upgrade operation on corresponding firmware according to the firmware upgrade file in the firmware upgrade package.

In this embodiment, the mobile terminal may include multiple pieces of firmware to be upgraded, such as a binary file, a file system, and an upgrade execution script. After a server side performs an operation on the firmware upgrade file of at least one firmware to be upgraded and sends the formed firmware upgrade package through the air interface to the mobile terminal whose firmware is to be upgraded, the receiving module 61 in the mobile terminal stores the received firmware upgrade package in the cache (CACHE) partition 65. Further, the reading module 62 reads the firmware upgrade package in the cache partition 65. The firmware upgrade package includes: the first encryption data, the first check data, and the firmware upgrade file. The decrypting module 63 performs the decryption on the first encryption data in the firmware upgrade package to form the second check data. When the second check data is consistent with the first check data, the upgrading module 64 performs the upgrade operation on the corresponding firmware according to the firmware upgrade file in the firmware upgrade package.

In the mobile terminal in this embodiment of the present invention, after the receiving module receives the firmware upgrade package formed by the server by performing check, encryption, and combination processing on the firmware upgrade file, the checking module performs a corresponding decryption operation on the firmware upgrade package to perform a firmware upgrade, which solves a defect in the prior art that the mobile terminal is vulnerable to intrusion of illegal codes, quickly implements upgrade of multiple pieces of firmware, and improves security of the mobile terminal.

Figure 7:
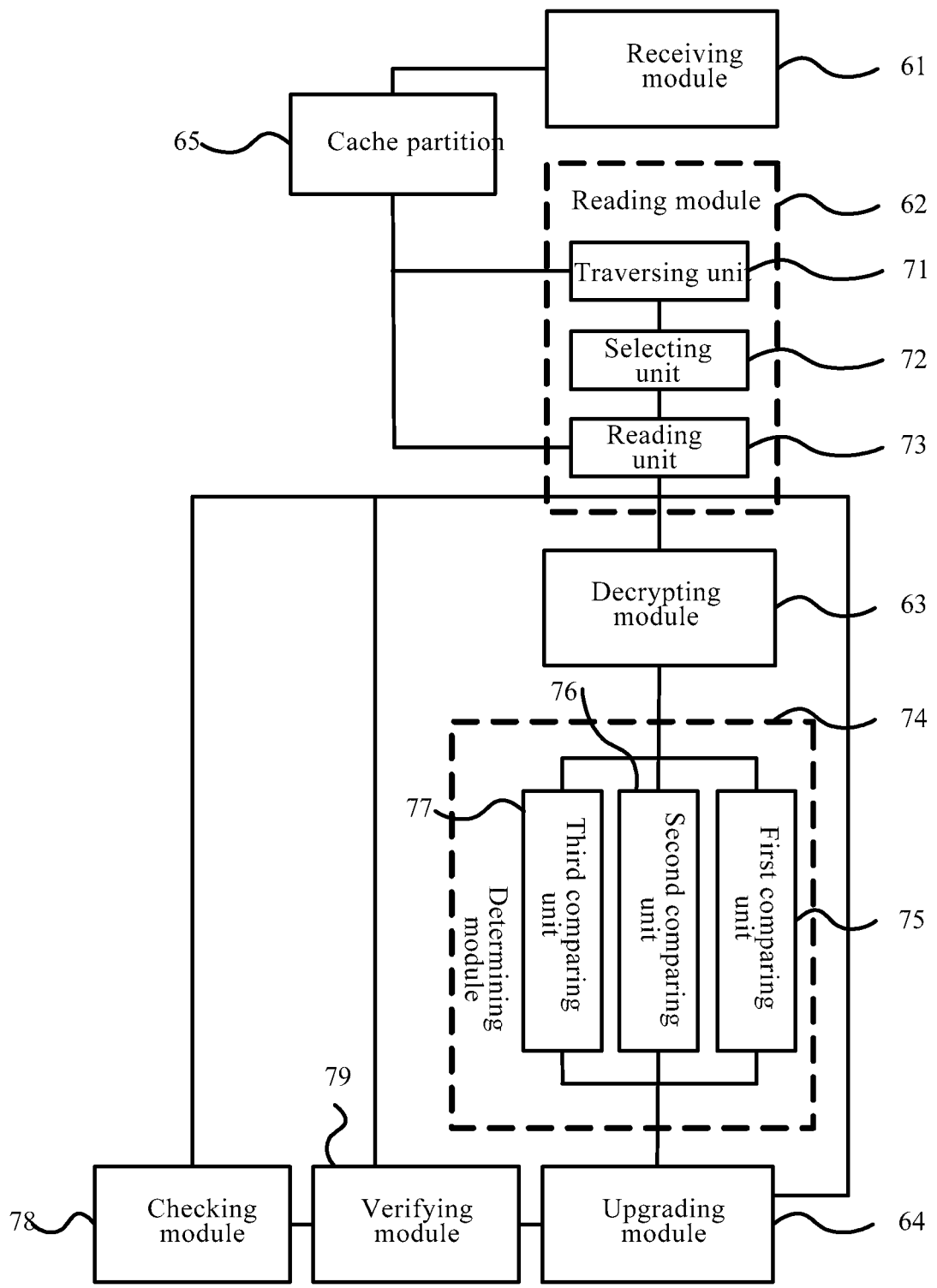
FIG. 7 is a schematic structural diagram of the mobile terminal according to another embodiment of the present invention.

FIG. 7 is a schematic structural diagram of a mobile terminal according to another embodiment of the present invention. As shown in FIG. 7, on the basis of the foregoing mobile terminal embodiment, the reading module 62 may include: a traversing unit 71, a selecting unit 72, and a reading unit 73, where the traversing unit 71 is configured to traverse the cache partition 65 to obtain file headers corresponding to a firmware upgrade package; the selecting unit 72 is configured to select, from the file headers corresponding to the firmware upgrade package, a valid file header as a target file header; and the reading unit 73 is configured to, according to an ID in the target file header, read data packets corresponding to the ID, and arrange these data packets in sequence to form the firmware upgrade package.

In the CACHE partition 65, if a certain file is stored, assume that its identity (ID) is ID_a, a file header including ID_a needs to be written into the CACHE partition; when updating the file, set its corresponding file header to invalid (that is, write a file header whose file name is "unlinked" and whose ID is ID_a into the CACHE partition), and then re-write a new file header (assume that an ID of an updated file is ID_b; then write a file header including ID_b into the CACHE partition). Therefore, among all the file headers corresponding to the firmware upgrade package, the selecting unit 72 deletes a file header whose ID is the same as the ID of the file header whose file name is "unlinked". Then, all the remaining file headers are valid file headers. One from the valid file headers is selected as the target file header.

In this embodiment of the present invention, on the basis of the technical solution shown in the following FIG. 6, the firmware upgrade package received by the mobile terminal is stored in the CACHE partition 65. A yaffs2 file system may be used. The reading module 62 which is in the mobile terminal and is configured to read the firmware upgrade package may be OEMSBL, where the OEMSBL does not support the yaffs2 file system. Therefore, the traversing unit 71 traverses the cache partition to obtain all the file headers corresponding to the firmware upgrade package, for example, obtaining all file headers that meet a requirement of an upgrade packet file name; then, among these file headers, the selecting unit 72 deletes a file header as long as its ID is the same as the ID of the file header whose file name is "unlinked"; then, selecting the target file header from the remaining file headers according to a certain rule, for example, the selecting unit 72 may include a first selecting subunit configured to select, from valid file headers corresponding to the firmware upgrade package, a file header with a maximum block number (block-num) as the target file header, and a second selecting subunit configured to select, when multiple file headers whose block numbers are the same exist, a file header that has a maximum Flash address from the multiple file headers whose block numbers are the same as the target file header; after the target file header is selected, the reading unit 73 reads the data packets corresponding to the ID of the target file header, and arranges these data packets in sequence to form the firmware upgrade package.

Further, the decrypting module 63 is specifically configured to perform public key decryption on first encryption data in the firmware upgrade package and use decrypted data as second check data.

Further, the mobile terminal provided in this embodiment of the present invention may further include: a determining module 74. The determining module 74 is configured to, after the decrypting module 63 performs the decryption on the first encryption data in the firmware upgrade package to form the second check data, determine whether the second check data is consistent with first check data; the determining module 74 may include: a first comparing unit 75, a second comparing unit 76, and/or a third comparing unit 77, where the first comparing unit 75 is configured to directly compare the second check data and the first check data to determine whether they are the same when the first check data is CRC data and the first encryption data is data obtained after private key encryption is performed on the CRC data; the second comparing unit 76 is configured to directly compare the second check data and the first check data to determine whether they are the same when the first check data is MD5 information check data and the first encryption data is data obtained after the private key encryption is performed on the MD5 information check data; and the third comparing unit 77 is configured to, when the first check data is the CRC data and the first encryption data is data obtained after the private key encryption is performed on the MD5 information corresponding to the CRC data, perform MD5 processing on the CRC data in the firmware upgrade package to form second MD5 information, and verify whether the second check data is consistent with the second MD5 information, where the second check data is MD5 information formed after decryption of the first encryption data in the firmware upgrade package.

Still further, the mobile terminal in this embodiment of the present invention may further include: a checking module 78 and a verifying module 79, where the checking module 78 is configured to, before the upgrading module 64 performs an upgrade operation on corresponding firmware according to the firmware upgrade file in the firmware upgrade package, perform check processing on a firmware upgrade file to form third check data; the verifying module 79 is configured to verify whether the third check data is consistent with the first check data in the firmware upgrade package; at this time, if the third check data is consistent with the first check data in the firmware upgrade package, the upgrading module 64 is configured to perform the upgrade operation on the corresponding firmware according to the firmware upgrade file in the firmware upgrade package; otherwise, discard the firmware upgrade file without performing the upgrade operation on the corresponding firmware according to the firmware upgrade file.

In the mobile terminal in this embodiment, after the receiving module receives the firmware upgrade package formed by the server by performing check, encryption, and combination processing on the firmware upgrade file, the checking module performs the check processing on the firmware upgrade package, and the upgrading module performs a firmware upgrade after a check is passed, which solves a defect in the prior art that an operation is complicated and the mobile terminal is vulnerable to intrusion of illegal codes, quickly implements upgrade of multiple pieces of firmware, and improves security of the mobile terminal.

Figure 8:
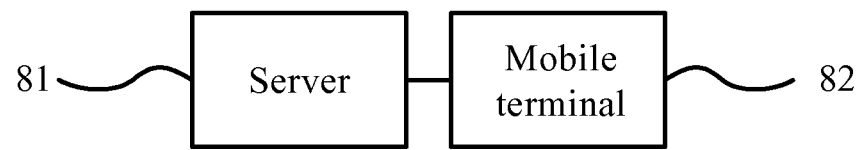
FIG. 8 is a block diagram of a system for upgrading firmware based on a firmware over the air technology according to an embodiment of the present invention.

FIG. 8 is a block diagram of a system for upgrading firmware based on a firmware over the air technology according to an embodiment of the present invention. As shown in FIG. 8, this embodiment of the present invention provides a system for upgrading firmware based on the firmware over the air technology, including: a server 81 and a mobile terminal 82.

Reference may be made to the specific description in the foregoing embodiment shown in FIG. 4 or FIG. 5 for a function of the server 81 in this system embodiment, and reference may be made to the specific description in the foregoing embodiment shown in FIG. 6 or FIG. 7 for a function of the mobile terminal 82, which are not repeatedly described here.

In the system for upgrading firmware based on the firmware over the air technology in this embodiment, after receiving a firmware upgrade package formed by a server by performing check, encryption, and combination processing on a firmware upgrade file, the mobile terminal performs check processing on the firmware upgrade package, and performs a firmware upgrade after a check is passed, which solves a defect in the prior art that an operation is complicated and the mobile terminal is vulnerable to intrusion of illegal codes, quickly implements upgrade of multiple pieces of firmware, and improves security of the mobile terminal.

Persons of ordinary skill in the art may understand that, all or part of the steps in the foregoing method embodiments may be completed by a program instructing relevant hardware. The program may be stored in a computer readable storage medium. When the program is executed, the steps including the foregoing method embodiments are executed. The storage medium includes: various media that may store program codes, such as a ROM, a RAM, a magnetic disk, or a compact disk, and so on.

Finally, it should be noted that the foregoing embodiments are merely intended to illustrate the technical solutions of the present invention, but not to limit it. Persons of ordinary skill in the art should understand that, they may still make modifications to the technical solutions recorded in each foregoing embodiment, or make equivalent replacements to part of the technical features in it, and these modifications or replacements do not make the nature of corresponding technical solutions depart from the spirit and scope of the technical solutions of each embodiment of the present invention.

What is claimed is:

1. A method for providing firmware upgrades based on a firmware over the air technology, comprising:
    performing, by a server, check processing on at least one firmware upgrade file to form first check data corresponding to the at least one firmware upgrade file;
    performing, by the server, encryption processing on the first check data to form first encryption data; and
    combining, by the server, the first encryption data, the first check data, and the at least one firmware upgrade file to form a firmware upgrade package, and sending, by the server, the firmware upgrade package, through an air interface, to a mobile terminal;
    wherein performing check processing to form first check data comprises:
        performing cyclic redundancy check (CRC) processing, by the server, on the at least one firmware upgrade file to form CRC data as the first check data; or
        performing Message-Digest Algorithm 5 (MD5) processing, by the server, on the at least one firmware upgrade file to form MD5 information check data as the first check data;
    wherein performing encryption processing on the first check data to form the first encryption data comprises:
        when the first check data is CRC data, performing MD5 processing on the CRC data to form MD5 information corresponding to the CRC data, and performing a private key encryption on the MD5 information corresponding to the CRC data to form the first encryption data; or
        when the first check data is MD5 information check data, performing CRC processing on the MD5 information check data to form CRC data corresponding to the MD5 information check data, and performing a private key encryption on the CRC data corresponding to the MD5 information check data to form the first encryption data;
    wherein the private key is internally stored in the server and matches with a public key internally stored in the mobile terminal.

2. The method according to claim 1, further comprising:
    obtaining, by the server, multiple firmware upgrade files before performing the check processing on the at least one firmware upgrade wherein the firmware upgrade package comprises the obtained multiple firmware upgrade files.

3. A method for upgrading firmware based on a firmware over the air technology, comprising:
    receiving, by a mobile terminal, through an air interface, a firmware upgrade package sent by a server, and storing the firmware upgrade package in a cache partition, wherein a file system of the firmware upgrade package is not supported the mobile terminal;
    reading, by the mobile terminal, the firmware upgrade package stored in the cache partition, wherein the firmware upgrade package comprises: first encryption data, first check data, and a firmware upgrade file;
    performing, by the mobile terminal, decryption on the first encryption data in the firmware upgrade package to form second check data; and
    when the second check data is consistent with the first check data, performing, by the mobile terminal, an upgrade operation on corresponding firmware according to the firmware upgrade file in the firmware upgrade package;
    wherein reading the firmware upgrade package stored in the cache partition comprises:
        traversing the cache partition to obtain file headers corresponding to the firmware upgrade package;
        selecting, from the file headers corresponding to the firmware upgrade package, a valid file header as a target file header; and
        reading, according to an identity in the target file header, data packets corresponding to the identity, and rearranging the data packets corresponding to the identity to form the firmware upgrade package.

4. The method according to claim 3, wherein selecting the valid file header as the target file header comprises:
    selecting, from valid file headers corresponding to the firmware upgrade package, a file header with a maximum block number as the target file header; and
    when multiple file headers have the maximum block number, selecting, from the multiple file headers, a file header that has a maximum flash address as the target file header.

5. The method according to claim 4, wherein before performing the upgrade operation, the method further comprises:
    performing check processing on the firmware upgrade file to form third check data;
    verifying whether the third check data is consistent with the first check data in the firmware upgrade package; and
        if the third check data is consistent with the first check data in the firmware upgrade package, performing the upgrade operation on the corresponding firmware according to the firmware upgrade file in the firmware upgrade package; or
        if the third check data is not consistent with the first check data in the firmware upgrade package, discarding the firmware upgrade file without performing the upgrade operation on the corresponding firmware according to the firmware upgrade file.

6. The method according to claim 3, wherein performing decryption on the first encryption data comprises:
   performing public key decryption, by the mobile terminal, on the first encryption data in the firmware upgrade package;
   wherein the public key is internally stored in the mobile terminal and matches with a private key internally stored in the server.

7. The method according to claim 6, wherein after performing decryption on the first encryption data, the method further comprises:
   (a) when the first check data is cyclic redundancy check (CRC) data, and the first encryption data is data obtained by private key encryption being performed on the CRC data, directly comparing the second check data and the first check data to determine whether the second check data and the first check data are the same;
   (b) when the first check data is Message-Digest Algorithm 5 (MD5) information check data, and the first encryption data is data obtained by private key encryption being performed on the MD5 information check data, directly comparing the second check data and the first check data to determine whether the second check data and the first check data are the same; and
   (c) when the first check data is CRC data, and the first encryption data is data obtained by private key encryption being performed on MD5 information corresponding to the CRC data, performing MD5 processing on the CRC data in the firmware upgrade package to form second MD5 information, and verifying whether the second check data is consistent with the second MD5 information.

8. The method according to claim 7, wherein before performing the upgrade operation, the method further comprises:
   performing check processing on the firmware upgrade file to form third check data;
   verifying whether the third check data is consistent with the first check data in the firmware upgrade package; and
      if the third check data is consistent with the first check data in the firmware upgrade package, performing the upgrade operation on the corresponding firmware according to the firmware upgrade file in the firmware upgrade package; or
      if the third check data is not consistent with the first check data in the firmware upgrade package, discarding the firmware upgrade file without performing the upgrade operation on the corresponding firmware according to the firmware upgrade file.

9. The method according to claim 6, wherein before performing the upgrade operation, the method further comprises:
   performing check processing on the firmware upgrade file to form third check data;
   verifying whether the third check data is consistent with the first check data in the firmware upgrade package; and
      if the third check data is consistent with the first check data in the firmware upgrade package, performing the upgrade operation on the corresponding firmware according to the firmware upgrade file in the firmware upgrade package; or
      if the third check data is not consistent with the first check data in the firmware upgrade package, discarding the firmware upgrade file without performing the upgrade operation on the corresponding firmware according to the firmware upgrade file.

10. The method according to claim 3, wherein before performing the upgrade operation, the method further comprises:
   performing check processing on the firmware upgrade file to form third check data;
   verifying whether the third check data is consistent with the first check data in the firmware upgrade package; and
      if the third check data is consistent with the first check data in the firmware upgrade package, performing the upgrade operation on the corresponding firmware according to the firmware upgrade file in the firmware upgrade package; or
      if the third check data is not consistent with the first check data in the firmware upgrade package, discarding the firmware upgrade file without performing the upgrade operation on the corresponding firmware according to the firmware upgrade file.

* * * * *